(12) United States Patent
Kim et al.

(10) Patent No.: US 9,037,496 B2
(45) Date of Patent: May 19, 2015

(54) ESL SYSTEM USING SMART PHONE AND OPERATING METHOD THEREOF

(71) Applicant: SAMSUNG ELECTRO-MECHANICS CO., LTD., Gyeonggi-Do (KR)

(72) Inventors: Seong Yeon Kim, Suwon-si (KR); Sun Young Yu, Suwon-si (KR)

(73) Assignee: SAMSUNG ELECTRO-MECHANICS CO., LTD., Gyeonggi-Do (KR)

(*) Notice: Subject to any disclaimer, the term of this patent is extended or adjusted under 35 U.S.C. 154(b) by 0 days.

(21) Appl. No.: 14/258,545

(22) Filed: Apr. 22, 2014

(65) Prior Publication Data

US 2014/0316944 A1    Oct. 23, 2014

(30) Foreign Application Priority Data

Apr. 23, 2013 (KR) ........................ 10-2013-0044720

(51) Int. Cl.
| | |
|---|---|
| G06Q 30/00 | (2012.01) |
| G06Q 30/06 | (2012.01) |
| G06Q 10/00 | (2012.01) |
| G06Q 10/04 | (2012.01) |
| G06Q 10/08 | (2012.01) |

(52) U.S. Cl.
CPC ............ *G06Q 30/0623* (2013.01); *G06Q 10/30* (2013.01); *G06Q 10/047* (2013.01); *G06Q 10/08* (2013.01)

(58) Field of Classification Search
USPC ........................................................ 705/26.1
See application file for complete search history.

(56) References Cited

U.S. PATENT DOCUMENTS 6,386,450 B1 * 5/2002 Ogasawara .................. 235/383

2010/0070365 A1    3/2010 Siotia et al.
2010/0287057 A1    11/2010 Aihara et al.
2013/0324161 A1 * 12/2013 Rhoads et al. ............ 455/456.3

FOREIGN PATENT DOCUMENTS

| KR | 1020100041969 A | 4/2010 |
|---|---|---|
| KR | 1020110058100 A | 6/2011 |
| KR | 10-2012-0000709 A | 1/2012 |
| KR | 10-2012-0040404 A | 4/2012 |
| WO | 2012-154091 A1 | 11/2012 |

OTHER PUBLICATIONS

KR 10-2013-0044720 Office Action dated Jul. 30, 2014; 5pgs.
EP 14275088.4 Search Report dated Aug. 12, 2014; 8pgs.

* cited by examiner

*Primary Examiner* — Mila Airapetian
(74) *Attorney, Agent, or Firm* — Bracewell & Giuliani LLP; Brad Y. Chin

(57) ABSTRACT

Embodiments of the invention provide an ESL system using a smart phone and an operating method thereof. In accordance with at least one embodiment, the operating method of an ESL system using a smart phone includes listing purchase target product items and transmitting a product purchase item list through a smart phone of a user, and receiving the product purchase item list through a gateway, searching products of purchase items, and transmitting position information of each product to the smart phone, by an ESL server. The method further includes calculating an optimal path from a current position of the smart phone to a position of each product based on the position information of each product by the smart phone, and transmitting final position information of a corresponding product to the smart phone by the ESL server, when the smart phone approaches the corresponding product of a purchase target depending on a movement of the user based on the optimal path.

7 Claims, 4 Drawing Sheets

ESL SYSTEM USING SMART PHONE AND OPERATING METHOD THEREOF

CROSS REFERENCE TO RELATED APPLICATION

This application claims the benefit of and priority under 3 U.S.C. §119 to Korean Patent Application No. KR 10-2013-0044720, entitled "ESL System Using Smart Phone and Operating Method Thereof," filed on Apr. 23, 2013, which is hereby incorporated by reference in its entirety into this application.

BACKGROUND

1. Field of the Invention

The present invention relates to an electronic shelf label (ESL) system, and more particularly, to an ESL system using a smart phone capable of increasing convenience of a consumer by operating the smart phone in connection with the ESL system, and an operating method thereof.

2. Description of the Related Art

An ESL system is a system that guides price information on products by operating together with a point-of-sale (POS) device using ESL tags and assists in purchasing products and operating a store by additionally displaying various promotion information such as a unit price, a discount price, a normal price, a production display position mark, point information, a display amount, and the like.

Generally, the ESL system is configured so as to allocate time slots to a plurality of ESL tags and be waken up only during the allocated time slots to perform wireless communication with an ESL server. The number of ESL tags included in the ESL system is rapidly increased depending on a size of a store to which the ESL system is applied. Therefore, in this case, a coordinator, a router, or the like, relays between the ESL server and the ESL tag.

In the ESL tag (electronic label) included in the ESL system as described above, price information is continuously updated periodically or aperiodically. The price information is updated in a scheme of receiving data from a gateway connected to the ESL tag (electronic label) and displaying the corresponding data on a display.

Meanwhile, in the ESL system according to the related art, as generally described for example in Korean Patent Laid-Open Publication No. 10-2010-0041969 and Korean Patent Laid-Open Publication No. 10-2011-0058100, there are devices providing information on products within a large store. Therefore, consumers may obtain simple information on products through these devices. However, it is difficult for the consumers to recognize where these products are exactly positioned and optimal paths through which they move from their current positions to positions of the products. Therefore, the consumers experience troublesome moving processes and consume a large time until they arrive at places at which products desired by them are disposed.

SUMMARY

Accordingly, embodiments of the invention provide an ESL system using a smart phone capable of increasing convenience of a consumer and easily managing products by operating a smart phone of a user (consumer) in connection with the ESL system to provide position and price information on the products from the ESL system to the smart phone, and an operating method thereof.

According to an embodiment of the invention, there is provided an ESL system using a smart phone including an ESL tag positioned on a product displayed on a shelf, a gateway receiving transmission data from the ESL tag and transmitting the received transmission data to an upper device, and receiving data provided from the upper device and transferring the received data to the ESL tag, an ESL server processing the data received through the gateway and providing various information and data associated with the product and a sale to the ESL tag, and the smart phone transmitting and receiving product information and position information to and from the gateway through wireless communication.

In accordance with at least one embodiment, the smart phone includes an algorithm, for example, a software program, wherein the calculating an optimal path from a current position of the smart phone to a position of any product based on the position information of any product provided from the ESL server.

In accordance with at least one embodiment, the ESL system further includes a sensor, for example, a Zigbee sensor, installed at a predetermined position of the shelf and provides display position and price information of each detailed product to the smart phone.

According to another embodiment of the invention, there is provided an operating method of an ESL system using a smart phone, including a) listing purchase target product items and transmitting a product purchase item list through the smart phone of a user, b) receiving the product purchase item list through a gateway, searching products of purchase items, and transmitting position information of each product to the smart phone, by an ESL server, c) calculating an optimal path from a current position of the smart phone to a position of each product based on the position information of each product by the smart phone, and d) transmitting final position information on a corresponding product to the smart phone by the ESL server when the smart phone approaches the corresponding product of a purchase target depending on a movement of the user based on the optimal path.

In accordance with at least one embodiment, the operating method of an ESL system using a smart phone may further include, after the calculating of the optimal path in the step c), transmitting ACL/NACK signals from the gateway to the smart phone and estimating the current position of the smart phone by the smart phone based on the ACL/NACK signals.

In accordance with at least one embodiment, the operating method of an ESL system using a smart phone further includes determining a movement direction of the smart phone using information on the estimated current position of the smart phone and an acceleration sensor in the smart phone.

In accordance with at least one embodiment, the operating method of an ESL system using a smart phone further includes comparing a received signal strength indicator (RSSI) value of the smart phone with a measured RSSI value of each position close to the gateway, provided from the ESL server and transmitting a comparison result, by the smart phone, when the smart phone approaches the corresponding product in the step d).

In accordance with at least one embodiment, the operating method of an ESL system using the smart phone further includes comprising receiving the comparison result by the ESL server and determining whether a difference between the received and the measured RSSI values is within a preset error range.

In accordance with at least one embodiment, the final position information on the corresponding product of the purchase target is transmitted to the smart phone by the ESL server, when it is determined in the determining that the difference between the received and the measured RSSI values is within the preset error range.

In accordance with at least one embodiment, a subsequent comparison result be received from the smart phone and the determining is again performed on the subsequent comparison result, by the ESL server, when it is determined in the determining that the difference between the received and the measured RSSI values is out of the preset error range.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
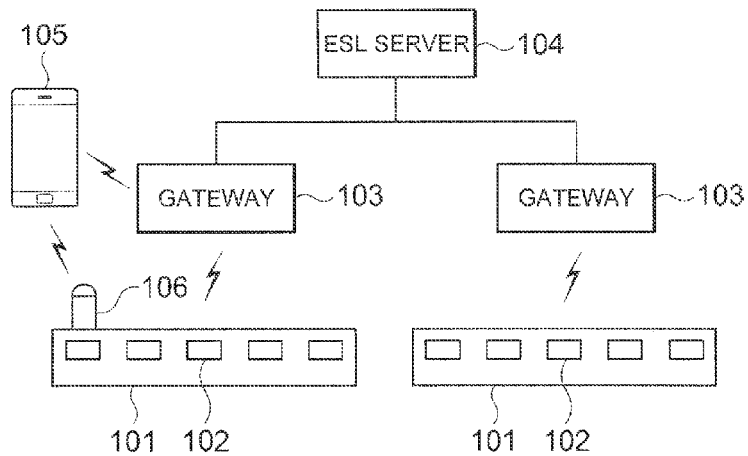
FIG. 1 is a view schematically showing a configuration of an ESL system using a smart phone, in accordance with an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

FIG. 1 is a view schematically showing a configuration of an electronic shelf label (ESL) system using a smart phone, in accordance with an embodiment of the invention.

Referring to FIG. 1, the ESL system using a smart phone, in accordance to at least one embodiment, is configured to include ESL tags 102, gateways 103, and an ESL server 104.

As shown in FIG. 1, the ESL tags 102, in accordance with at least one embodiment, are positioned on products (not shown) displayed on a shelf (display stand) 101. Here, the ESL tag 102 as described above include a wireless communicator unit configured to perform wireless transmission and reception, a processor configured to analyze and process a signal transferred through the wireless communicator unit, a memory configured to store information and data required for the processor, a display unit configured to display information to a user depending on the processed signal, and a power supply unit configured to supply driving power to the respective components.

In accordance with at least one embodiment, the gateway 103 is configured to receive transmission data from the ESL tag 102 and transmit the received transmission data to an upper device (for example, the ESL server 104 herein), and receive data provided from the upper device and transfer the received data to the ESL tag 102. The gateway 103, as described above, is configured to convert different protocols between the ESL to 102 using a wireless communication network and the ESL server 104 using a local area network (LAN), which is a wired communication network, to relay information to be transmitted and received between the ESL tag 102 and the ESL server 104.

As further shown in FIG. 1 the ESL server 104 is configured to process the data received through the gateway 103 and provide various information and data associated with products and sales to the ESL tag 102. In the ESL server 104, as generally described above, a database (not shown) in which various information and data are stored is separately provided outside the ESL server 104 or a large capacity memory is provided in the ESL server 104, such that a database builds up in the ESL server 104 itself.

Here, particularly, the ESL system, in accordance with at least one embodiment, further includes a smart phone 105, which is a terminal, for example a hardware terminal, configured to transmit and receive product information and position information to and from the gateway 103 through wireless communication. However, the terminal is not necessarily limited to the smart phone 105. That is, a terminal (for example, a personal digital assistant (PDA), a tablet personal computer (PC), or the like) that performs wireless transmission and reception to and from the gateway 103 may be used instead of the smart phone 105 according to various embodiments.

In accordance with at least one embodiment, the smart phone 105 is mounted with an algorithm (for example, a software program) and configured to calculate an optimal path from a current position of the smart phone 105 to a position of any product based on position information on any product provided from the ESL server 104. This algorithm will be again described later in more detail.

In addition, the ESL system, in accordance with at least one embodiment, further includes a sensor, for example, a Zigbee sensor 106, configured to display position and price information on each detailed product displayed on the shelf 101 to the smart phone 105. The Zigbee sensor 106, as described above, which is a sensor based, for example, on Zigbee is installed at a predetermined position of the shelf 101.

Next, an operating method of an ESL system using a smart phone, in accordance with an embodiment of the invention, having the configuration as described above will be described.

Figure 2:
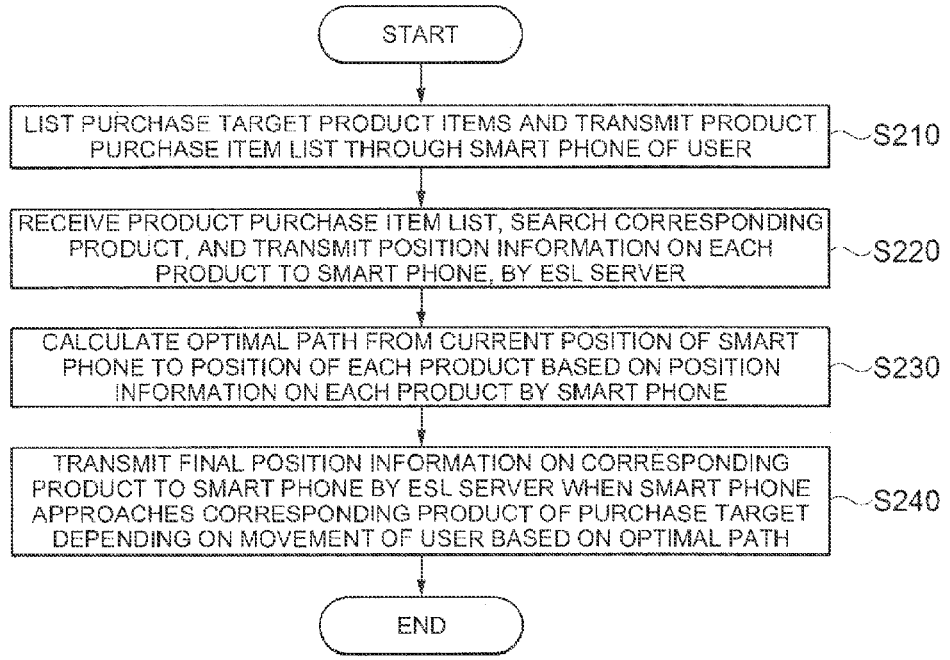
FIG. 2 is a flow chart showing execution processes of an operating method of an ESL system using a smart phone, in accordance with an embodiment of the invention.

FIG. 2 is a flow chart showing execution processes of an operating method of an ESL system using a smart phone, in accordance with an embodiment of the invention.

Referring to FIG. 2, in the operating method of an ESL system using a smart phone, in accordance with an embodiment of the invention, a user first lists purchase target product items and transmits the product purchase item list through the smart phone (S210).

Then, the ESL server 104 receives the product purchase item list through the gateway 103, searches the products of the purchase items from the database (not shown), and transmits position information on each product to the smart phone 105 (S220). Here, the position information on each product is created in advance by a system operator and is stored in the database. Therefore, the ESL server 104 searches and obtains position information on corresponding products listed on the product purchase item list from the database and provides the obtained position information to the smart phone 105.

In accordance with at least one embodiment, when the position information on each product is transmitted to the smart phone 105 as described above, the smart phone 105 calculates an optimal path from a current position (e.g., departure point) of the smart phone 105 to a position of each product based on the position information on each product (S230). Here, the calculation of the optimal path as described above is performed by an optimal path calculation algorithm mounted in the smart phone 105. The optimal path calculation algorithm as described above is manufactured to be included as one function in the smart phone at the time of manufacturing the smart phone. In accordance with another embodiment, the user accesses a site providing a specific application through the Internet to download the optimal path calculation algorithm.

As further shown in FIG. 2, after the optimal path is calculated as described above, when the smart phone 105 carried by the user moves together with the user to approach a corresponding product of the purchase target depending on movement of the user based on the optimal path, final position information (for example, product display position information on each detailed product) on the corresponding product is transmitted to the smart phone 105 by the ESL server 104 (S240). In this case, the ESL server 104 also transmits price information.

In accordance with at least one embodiment, when the final position information and the price information on the corresponding product are transmitted from the ESL server 104 to the smart phone 105 as described above, a final position (for example, a product display position for each detailed product) and a price of the corresponding product are displayed through a display of the smart phone 105. Therefore, the user conveniently finds the corresponding product.

Figure 3:
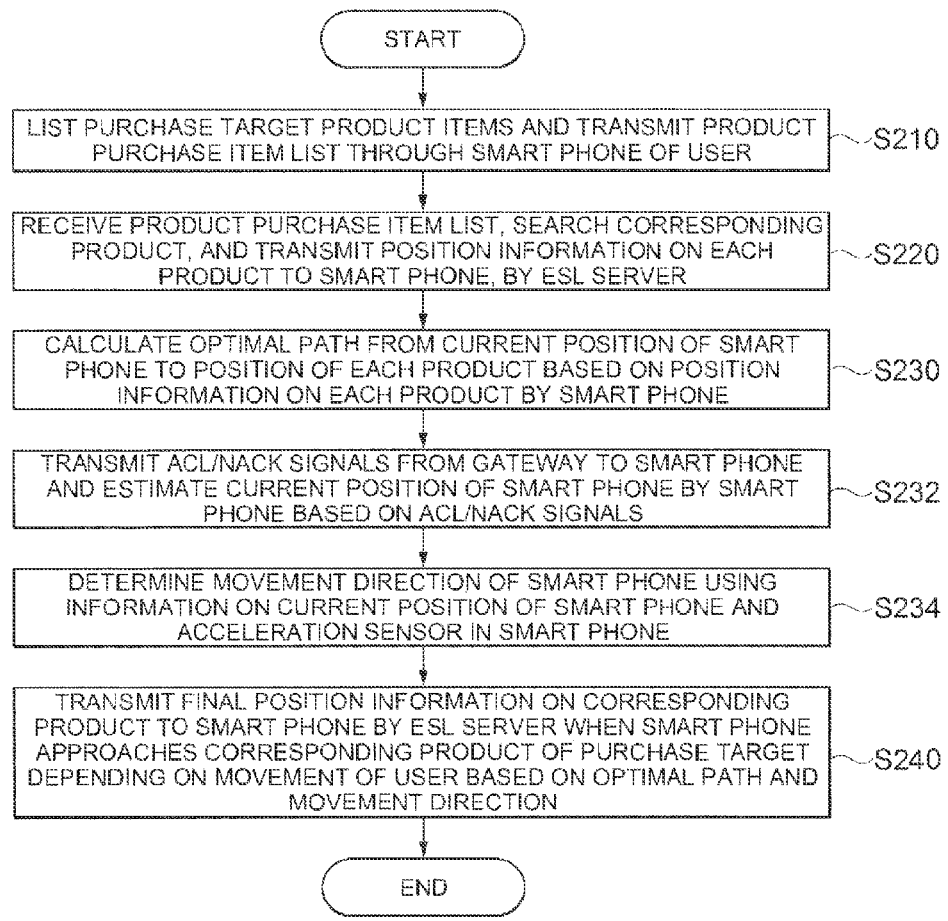
FIG. 3 is a flow chart showing execution processes of an operating method of an ESL system using a smart phone, in accordance with an embodiment of the invention.

In accordance with at least one embodiment, after the optimal path is calculated in S230, an operating method of an ESL system using a smart phone, in accordance with another embodiment, further includes transmitting ACK/NACK signals from the gateway 103 to the smart phone 105, and estimating a current position of the smart phone 105 by the smart phone 105 based on the ACK/NACK signals (S232), as shown in FIG. 3. Thus, the ACK/NACK signals are transmitted from an access point (AP) (i.e., that may be considered as the gateway) installed at a specific position within a store at a predetermined transmission rate (for example, 1 Mbps), and the smart phone 105 receiving the ACK/NACK signals estimates its current position (for example, estimates an approximation value based on signals transmitted from two APs).

In accordance with at least one embodiment, as further shown in FIG. 2, the operating method of an ESL system using a smart phone, in accordance with another embodiment, further includes determining a movement direction of the smart phone 105 using information on the estimated current position of the smart phone 105 and an acceleration sensor (not shown) in the smart phone (S234).

In accordance with at least one embodiment, when the current position (estimated value) and the movement direction of the smart phone are obtained as described above, they are combined with each other by the smart phone 105, such that navigation from the current position to a target object (corresponding product of the purchase target) is possible.

The current position estimation and the movement direction determination of the smart phone 105, as described above, will be further described with reference to FIG. 5.

Figure 5:
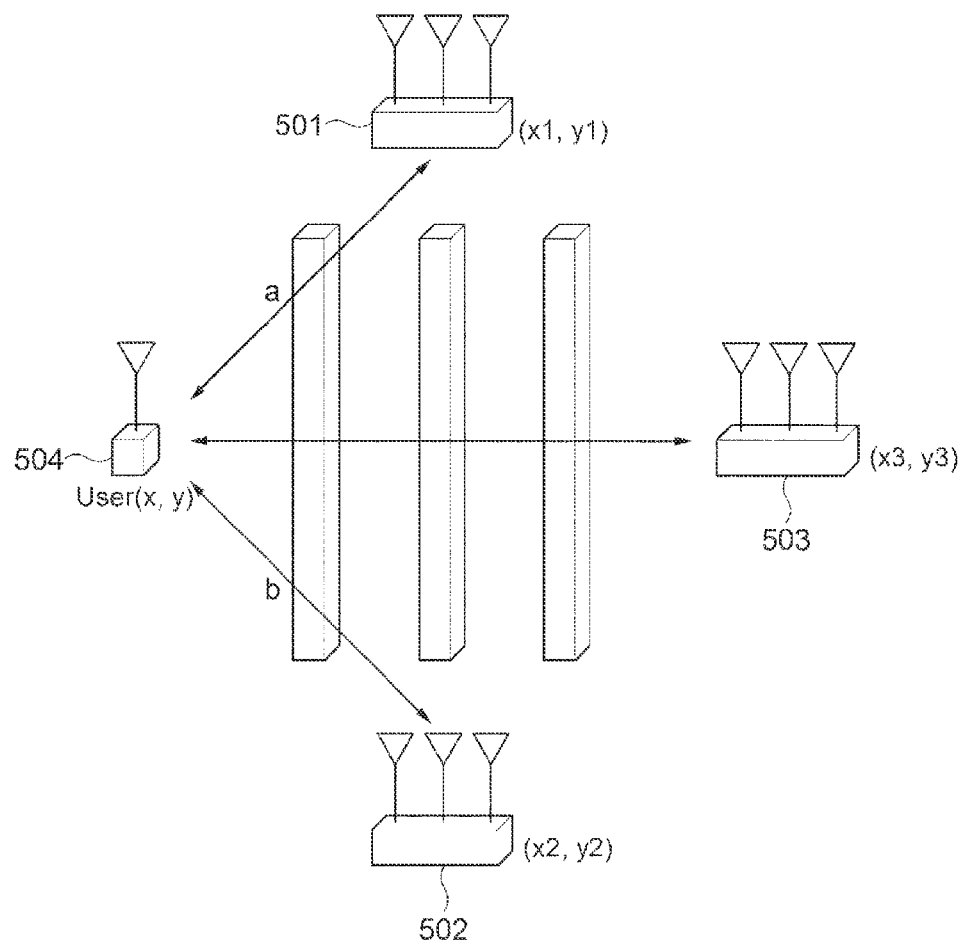
FIG. 5 is a view describing concepts of current position estimation and movement direction determination of a smart phone in the operating method of an ESL system using a smart phone, in accordance with an embodiment of the invention.

As shown in FIG. 5, a smart phone 504 of a user receives beacon signals from first and second APs (i.e., that may be considered as gateways) 501 and 502 presented at two symmetrical positions, such that distances a and b between the first and second APs 501 and 502 and the smart phone 504 of the user and position (coordinate) values x and y of the smart phone 504 are calculated, in accordance with at least one embodiment, by the following Equations.

$$(x-x_1)^2+(y-y_1)^2=a^2$$

$$(x-x_2)^2+(y-y_2)^2=b^2 \qquad \text{[Equation 1]}$$

In accordance with at least one embodiment, the distance values a and b are calculated by converting the RSSI at a current position of the smart phone 504. As a relationship between the RSSI and the distance value, data accumulated in advance through a simulation may be stored in the smart phone. Distributions of distance values allowing the distance value obtained through the simulation and an actual position of the smart phone to be recognized to be the same point are simply calculated as log normal distribution by large scale fading. A calculation algorithm of the above Equation 1 and a program (service) performing a series of processes above are provided to the user (consumer) by a store operator introducing and operating the ESL system. Therefore, the user (consumer) accesses a homepage of a store or a specific site designated by a store side using his/her smart phone to download this application and execute the download application, thereby making it possible to estimate his/her (smart phone's) current position as described above.

In accordance with at least one embodiment, in an analysis on an additional movement direction, for example, when a Y direction is determined by RSSI signal strength obtained between two APs 501 and 502 on a Y axis, and an X direction is determined by a third AP 503 that is additionally installed, a position and a direction may be determined without an acceleration sensor.

In the case in which the operating method of an ESL system using a smart phone, in accordance with at least one embodiment, further includes S232 and S234 as described above, since the "movement direction" of the smart phone 105 is determined in S234, the user moves based on the determined "movement direction" together with the "optimal path" (S240 of FIG. 3), unlike the operating method of an ESL system using a smart, in accordance with at least one embodiment, in which the user moves based on the optimal path in S240 of FIG. 2.

Figure 4:
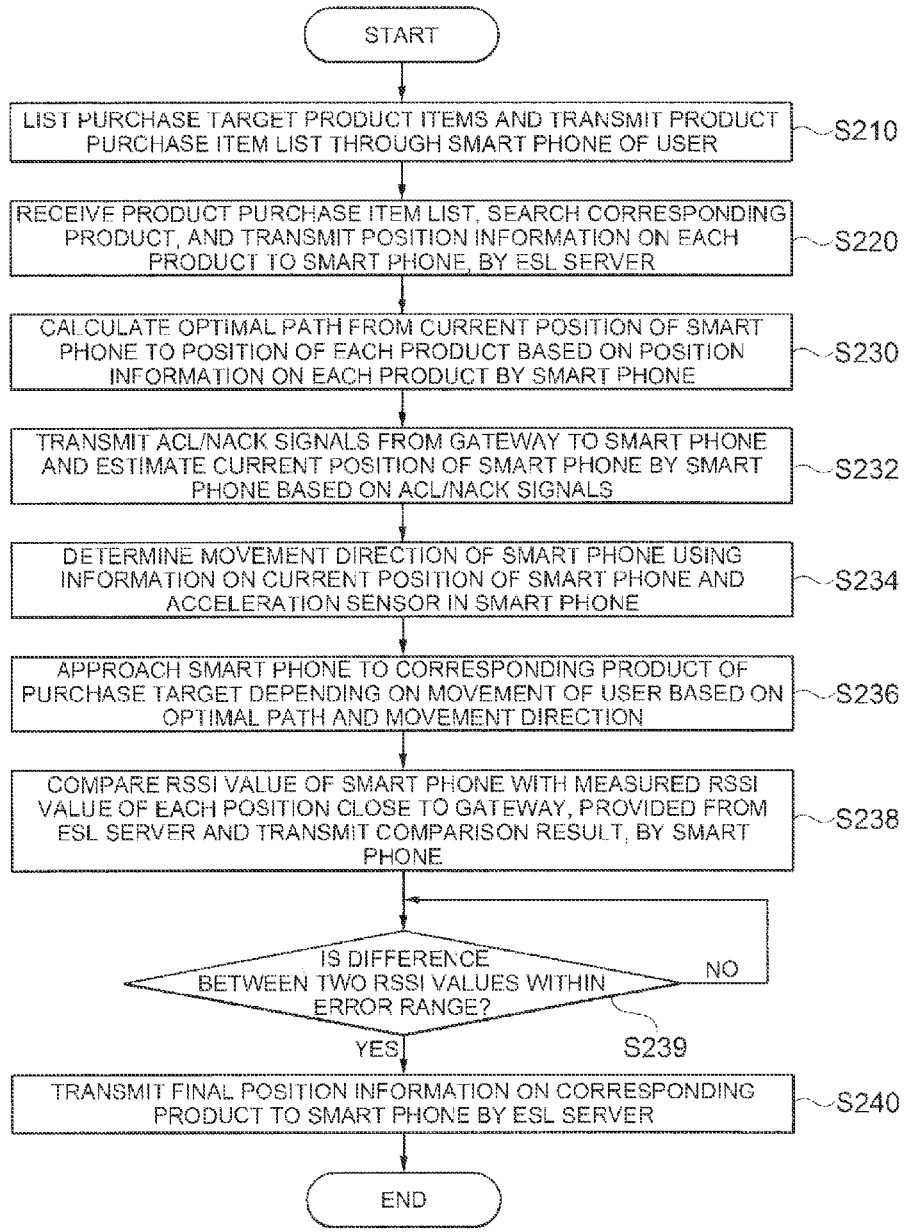
FIG. 4 is a flow chart showing execution processes of an operating method of an ESL system using a smart phone, in accordance with an embodiment of the invention.

As shown in FIG. 4, an operating method of an ESL system using a smart phone, in accordance with at least one embodiment, further includes comparing an RSSI value of the smart phone 105 with a measured RSSI value of each position close to the gateway, provided from the ESL server 105 and transmitting a comparison result, by the smart phone 105, (S238)

when the smart phone 105 carried by the user approaches the corresponding product depending on the movement of the user based on the optimal path and the movement direction in S240 of FIG. 3 (S236).

The operating method of an ESL system using a smart phone, in accordance with at least one embodiment, further includes receiving the comparison result by the ESL server 104 and determining whether a difference between the received and the measured RSSI values is within a preset error range (S239).

In accordance with at least one embodiment, when it is determined in S239 that the difference between the received and the measured RSSI values is within the preset error range, the ESL server 104 transmits final position information and price information on the corresponding product of the purchase target to the smart phone 105 (S240). That is, the ESL server 104 transmits the product display position and price information on each detailed product to the smart phone 105 through the Zigbee sensor 106. In this case, the smart phone 105 displays the product display position and the price on each detailed product through the display. Therefore, the user may conveniently find the corresponding product.

In accordance with at least one embodiment, when it is determined in S239 that the difference between the received and the measured RSSI values is out of the preset error range, the ESL server 104 receives a subsequent comparison result from the smart phone 105 and again performs the determining on the subsequent comparison result. That is, the ESL server 104 receives the subsequent comparison result from the smart phone 105 and again determines whether a difference between new received and measured RSSI values is within a preset error range.

As set forth above, with the ESL system using a smart phone and the operating method thereof, according to various embodiments of the invention, the smart phone of the user (consumer) is operated in connection with the ESL system to provide the position and price information on the products from the ESL system to the smart phone, thereby making it possible to increase convenience of the consumer and easily manage the products.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the system and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. An operating method of an ESL system using a smart phone, the method comprising:
   a) listing purchase target product items and transmitting a product purchase item list;
   b) receiving a position information of each product from an ESL server;
   c) calculating, by a processor, an optimal path from a current position of the smart phone to a position of each product based on the position information of each product;
   d) receiving final position information from the ESL server when the smart phone approaches the corresponding product of a purchase target depending on a movement of the user based on the optimal path; and
   comparing a received signal strength indicator (RSSI) value of the smart phone with a measured RSSI value of each position close to a gateway, provided from the ESL server and transmitting a comparison result.

2. The operating method of the ESL system using the smart phone according to claim 1, further comprising:
   after the calculating the optimal path, transmitting ACL/NACK signals from the gateway to the smart phone and estimating the current position of the smart phone by the smart phone based on the ACL/NACK signals.

3. The operating method of the ESL system using the smart phone according to claim 2, further comprising:
   determining a movement direction of the smart phone using information on the estimated current position of the smart phone and an acceleration sensor in the smart phone.

4. The operating method of an ESL system using the smart phone according to claim 1, further comprising:
   receiving the comparison result and determining whether a difference between the received and the measured RSSI values is within a preset error range.

5. The operating method of an ESL system using the smart phone according to claim 4, wherein the final position information of the corresponding product is transmitted to the smart phone by the ESL server when it is determined in the determining that the difference between the received and the measured RSSI values is within the preset error range.

6. The operating method of an ESL system using the smart phone according to claim 4, wherein a subsequent comparison result is received from the smart phone and the determining is again performed on the subsequent comparison result, by the ESL server, when it is determined in the determining that the difference between the received and the measured RSSI values is out of the preset error range.

7. An electronic shelf label (ESL) system using the smart phone operated by the method according to claim 1.

* * * * *